United States Patent
Stull et al.

(10) Patent No.: US 9,914,344 B1
(45) Date of Patent: Mar. 13, 2018

(54) TONNEAU ASSEMBLIES AND METHODS OF USE AND MANUFACTURE THEREOF

(71) Applicant: Honda Motor Co., Ltd., Tokyo (JP)

(72) Inventors: Brock J. Stull, Columbus, OH (US); Michael T Binfet, Bellefontaine, OH (US); Babuji K Tamarapoo, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/472,541

(22) Filed: Mar. 29, 2017

(51) Int. Cl.
*B60J 7/12* (2006.01)
*B60J 7/10* (2006.01)

(52) U.S. Cl.
CPC ............. *B60J 7/1204* (2013.01); *B60J 7/102* (2013.01)

(58) Field of Classification Search
CPC ... B60J 7/104; B60J 7/04; B60J 7/1204; B60J 7/102
USPC .................................................... 296/100.15
See application file for complete search history.

(56) References Cited

U.S. PATENT DOCUMENTS

| | | | |
|---|---|---|---|
| 3,768,540 A | 10/1973 | McSwain | |
| 4,032,186 A | 6/1977 | Pickering et al. | |
| 4,273,377 A | 6/1981 | Alexander | |
| 4,563,034 A | 1/1986 | Lamb | |
| 4,639,033 A | 1/1987 | Wheatley | |
| 4,673,208 A | 6/1987 | Tsukamoto | |
| 4,757,854 A | 7/1988 | Rippberger | |
| 4,792,178 A | 12/1988 | Kokx | |
| 4,923,240 A | 5/1990 | Swanson | |
| 5,058,652 A | 10/1991 | Wheatley et al. | |
| 5,324,091 A | 6/1994 | Baker | |
| 5,480,206 A | 1/1996 | Hathaway et al. | |
| 5,487,585 A | 1/1996 | Wheatley | |
| 5,690,377 A | 11/1997 | Denyer | |
| 5,702,147 A | 12/1997 | Essig | |
| 5,706,753 A | 1/1998 | Menne et al. | |
| 5,788,315 A | 8/1998 | Tucker | |
| 5,906,407 A | 5/1999 | Schmeichel | |
| 5,984,400 A | 11/1999 | Miller et al. | |
| 6,053,558 A | 4/2000 | Weldy et al. | |
| 6,224,139 B1 | 5/2001 | Weyand | |
| 6,234,561 B1 | 5/2001 | Huotari | |

(Continued)

FOREIGN PATENT DOCUMENTS

DE 3109542 A1 9/1982
DE 10024645 A1 1/2001

*Primary Examiner* — Joseph D. Pape
(74) *Attorney, Agent, or Firm* — Honda Patents & Technologies North America, LLC; William R. Fisher

(57) ABSTRACT

Some embodiments are directed to a tonneau assembly including a tonneau sheet configured to cover at least a part of an exposed area of a vehicle, and a rail assembly including a front rail connected to the tonneau sheet, a rear rail, and a pair of longitudinally extending side rails. The rear rail is pivotable between an open position that uncovers part of the exposed area of the vehicle, and a closed position that covers the part of the exposed area. The rear rail is connected to the tonneau sheet to apply a longitudinal tensioning force as the rear rail is pivoted from the open position to the closed position. The tonneau assembly includes a lateral tensioning assembly that is configured to apply a lateral tensioning force that is perpendicular to the longitudinal force as the rear rail is pivoted from the open position to the closed position.

16 Claims, 8 Drawing Sheets

(56) References Cited

U.S. PATENT DOCUMENTS

| | | |
|---|---|---|
| 6,257,306 B1 | 7/2001 | Weldy |
| 6,257,647 B1 | 7/2001 | Ninness et al. |
| 6,286,888 B1 | 9/2001 | Essig |
| 6,322,129 B2 | 11/2001 | Huotari |
| 6,427,500 B1 | 8/2002 | Weinerman et al. |
| 6,499,791 B2 | 12/2002 | Wheatley |
| 6,568,740 B1 | 5/2003 | Dimmer |
| 6,575,520 B1 | 6/2003 | Spencer |
| 6,607,234 B1 | 8/2003 | Schmeichel |
| 6,619,719 B1 | 9/2003 | Wheatley |
| 6,669,264 B1 | 12/2003 | Tucker |
| 6,685,240 B2 | 2/2004 | Bacon |
| 6,685,251 B2 | 2/2004 | Dumas |
| 6,719,353 B1 | 4/2004 | Isler et al. |
| 6,811,203 B2 | 11/2004 | Wheatley |
| 6,814,388 B2 | 11/2004 | Wheatley |
| 7,204,540 B2 | 4/2007 | Wheatley |
| 7,261,328 B2 | 8/2007 | Minix |
| 7,363,786 B2 | 4/2008 | Terhaar |
| 7,621,582 B2 | 11/2009 | Schmeichel et al. |
| 7,815,239 B1 | 10/2010 | Schmeichel et al. |
| 8,146,981 B2 | 4/2012 | Huotari et al. |
| 2002/0096909 A1* | 7/2002 | Schmeichel ............. B60J 7/102 296/100.15 |
| 2005/0057069 A1 | 3/2005 | Mcnamara |
| 2010/0123331 A1 | 5/2010 | Buelna et al. |
| 2010/0133872 A1* | 6/2010 | Kosinski ................. B60J 7/102 296/100.09 |
| 2015/0001877 A1 | 1/2015 | Fink |

\* cited by examiner

TONNEAU ASSEMBLIES AND METHODS OF USE AND MANUFACTURE THEREOF

BACKGROUND

The disclosed subject matter relates to tonneau assemblies, and methods of use and manufacture thereof. More particularly, the disclosed subject matter relates to assemblies for securing tonneau covers to exposed areas of vehicles, as well as related methods of use and manufacture.

Many types of vehicles include open or exposed areas, including but not limited to truck beds, unoccupied passenger seats in convertible automobiles, roadsters, etc., and rear internal storage compartments of sport utility vehicles, minivans and station wagons. Tonneaus can be used to cover these exposed areas for a variety of purposes depending on application. For example, using tonneaus to cover areas that are externally exposed, such as beds of pickup trucks and utility vehicles, and passenger compartments of convertible automobiles and roadsters, may protect internal surfaces of the truck beds and passenger compartments, as well as articles stored therein, from elements including but not limited to wind, rain, sun, etc. These tonneaus may also impede or prevent the unintentional removal of articles stored within these areas, such as while the vehicle is moving. Tonneaus may also be helpful to cover internally exposed areas, such as to shield articles stored therein from the view of individuals outside of the vehicle, such as for security reasons.

SUMMARY

The above disclosure is not intended to constitute an exhaustive listing of tonneau applications, and in particular vehicular areas that may benefit from being at least partially covered by tonneaus. Further, a variety of different types of tonneaus may be used to cover even the limited number of the different vehicular areas specifically disclosed above. For example, hard tonneaus that utilize a relatively inflexible and stiff sheet define a rigid surface to cover these open areas. The hard tonneaus may be beneficial by providing relatively resilient protection, such as from relatively large or heavy objects external to the covered area. Although rigid tonneaus may be relatively difficult to pierce, they may be relatively heavy, which decreases fuel efficiency and makes them difficult to manipulate, such as during installation and removal. The rigid and inflexible nature of hard tonneaus may also make them difficult to store in a compact manner.

Contrarily, soft tonneaus may be relatively light weight (enhancing fuel efficiency), easy to manipulate (e.g., during installation, removal, etc.), and compactable for storage. However, the soft tonneaus need to cover the exposed area under both longitudinal and lateral tension in order to be effective, such as to provide the protections disclosed above, as well as to provide resistance to water pooling, support for objects placed on the tonneau upper surface, provide a smooth appearance, and reduce flapping, such as during movement of the vehicle, which can generate wind noise and cause damage to the tonneau and/or vehicle.

Soft tonneaus can include a tonneau sheet, which is formed of relatively flexible material (such as synthetic fabric), that includes a forward end connected to a front rail, and an over-center rear rail that is attached to a rear end of the tonneau sheet. The rear rail can be manually pulled rearwardly to cover the exposed area and to tension the tonneau sheet longitudinally. Various apparatus can be used to connect sides of the tonneau sheet at sides of the exposed area, and to maintain lateral tension of the tonneau sheet that is applied by the user while covering the exposed area with the tonneau sheet. For example, loop and hook fasteners, snaps, zippers, etc. can be used for this connection and can maintain the lateral tension applied to the tonneau sheet by the user. As another example, plastic bars can be stitched along edges of the tonneau sheet to communicate with slots provided along side walls that define the open area to lock the tonneau sheet over the exposed area under lateral tension.

However, the operation of installing the above soft tonneau over the vehicle's exposed area requires separate manual operations. For example, a user (disposed at the rear of the vehicle) manually pulls the rear rail rearwardly and latches the rear rail at a rear end of the exposed area. The user (disposed at one side of the vehicle) then connects one side of the tonneau sheet to one sidewall that defines the exposed area. As a third operation, the user (disposed at the other side of the vehicle) pulls the other side of the tonneau toward the other side wall and connects the tonneau to that side wall under tension. Thus, the user is required to manipulate the tonneau from three sides to fully close and tension the tonneau, which involves a certain amount of, and in some cases significant, time and effort.

It may therefore be beneficial to provide a tonneau assembly, and methods of use and manufacture thereof, that simplify and/or reduce the manual effort disclosed above for installing a tonneau over an exposed area under both longitudinal and lateral tension. Some embodiments are therefore directed to such assemblies and methods that cover exposed areas under bi-directional tension (longitudinal and lateral) via a reduced number of, and/or simplified, manual operations. In some of these embodiments, a single manual operation is effective to cover the exposed areas under bi-directional tension, which obviates a user traveling to either side of the vehicle. In other words, the user would thereby be above to cover the exposed area under bi-directional tension merely by pulling the tonneau rearwardly and attaching a rear end of the tonneau at the rear of the exposed area.

Some embodiments are therefore directed to a tonneau assembly for removably covering an exposed area of a vehicle. The tonneau assembly can include a tonneau sheet configured to cover at least a part of the exposed area of the vehicle, and a rail assembly. The rail assembly can include a front rail connected to a forward end of the tonneau sheet, a rear rail, and a pair of longitudinally extending side rails configured to be statically disposed relative to the front rail. The rear rail can be pivotable relative to the side rails between an open position that uncovers at least a part of the exposed area of the vehicle, and a closed position that covers at least a part of the exposed area of the vehicle. The rear rail can be connected to a rearward end of the tonneau sheet so as to apply a tensioning force in the longitudinal direction as the rear rail is pivoted from the open position to the closed position. A lateral tensioning assembly can be configured to apply a tensioning force in a lateral direction that is perpendicular to the longitudinal direction as the rear rail is pivoted from the open position to the closed position.

Some other embodiments are directed to a vehicle that includes vertically extending panels configured to define an area therebetween that is exposed in the vertical direction, and a tonneau sheet configured to cover at least a part of the exposed area. A rail assembly can be connected to an upper surface of the panels. The rail assembly can include a front rail connected to the tonneau sheet, a rear rail, and a pair of longitudinally extending side rails configured to be statically disposed relative to the front rail. The rear rail can be pivotable relative to the side rails between an open position that uncovers at least a part of the exposed area, and a closed position that covers at least a part of the exposed area. The rear rail can be connected to the tonneau sheet so as to apply a tensioning force in the longitudinal direction as the rear rail is pivoted from the open position to the closed position. A lateral tensioning assembly can be configured to apply a tensioning force in a lateral direction that is perpendicular to the longitudinal direction as the rear rail is pivoted from the open position to the closed position.

Some other embodiments are directed to a cover assembly for a truck bed of a vehicle, the assembly comprising a flexible sheet including an upwardly facing surface and a downwardly facing surface, a forward end, a rearward end, a first lateral side, and a second lateral side, the first and second lateral sides each extend from the forward end to the rearward end. A first cable is secured to the first lateral side of the flexible sheet, a second cable is secured to the second lateral side of the flexible sheet, and a first side rail is positionable on or adjacent an upper surface of a first side panel. The first side rail includes an outboard wall that at least partially defines a first channel that optionally extends along the length of the first side rail. A second side rail is positionable on or adjacent an upper surface of a second side panel. The second side rail includes an outboard wall that at least partially defines a second channel that optionally extends along the length of the second side rail. A front rail is secured to the forward end of the flexible sheet, and the front rail is securable to the first side rail and the second side rail at the forward end of the truck bed. A rear rail is secured to the rearward end of the flexible sheet, and the rear rail is operatively connected to the first cable and the second cable and is removably engageable with the first side rail and the second side rail. The rear rail includes a rearward side that is rotatable when a forward side of the rear rail is engaged with the first side rail and the second side rail between a closed position wherein the rearward side of the rear rail is lowered and the first cable is positioned in the first channel under tension and the second cable is positioned in the second channel under tension to secure the flexible sheet to the first side rail and the second side rail, and an open position wherein the rearward side of the rear rail is raised and the first cable and the second cable are untensioned and removable from the first channel and the second channel.

Still other embodiments are directed to a method of manufacturing a tonneau assembly for removably covering an exposed area of a vehicle. The method can include: configuring a tonneau sheet to cover at least a part of the exposed area of the vehicle; connecting a front rail to the tonneau sheet; forming a pair of longitudinally extending side rails to be statically disposed relative to the front rail; and forming a rear rail to be pivotable relative to the side rails between an open position that uncovers at least a part of the exposed area of the vehicle, and a closed position that covers at least a part of the exposed area of the vehicle. The method can also include connecting the rear rail to the tonneau sheet so as to apply a tensioning force in the longitudinal direction if the rear rail is pivoted from the open position to the closed position; and configuring a lateral tensioning assembly to apply a tensioning force in a lateral direction that is perpendicular to the longitudinal direction if the rear rail is pivoted from the open position to the closed position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Vehicle and Tonneau Overview

Figure 1:
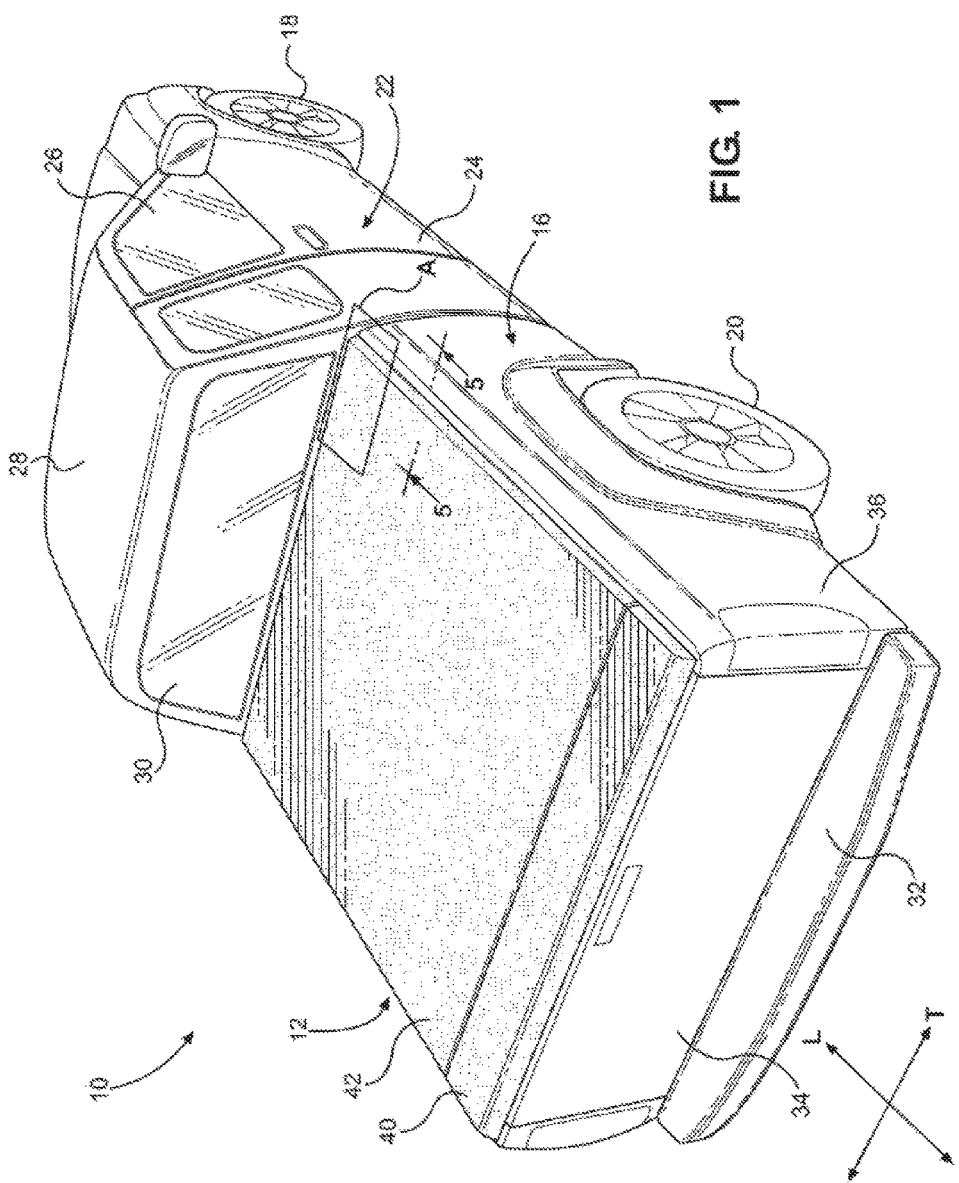
FIG. 1 is a rear perspective view of a vehicle with an exemplary tonneau in accordance with the present disclosure, with the tonneau in a fully closed position.
Figure 2:
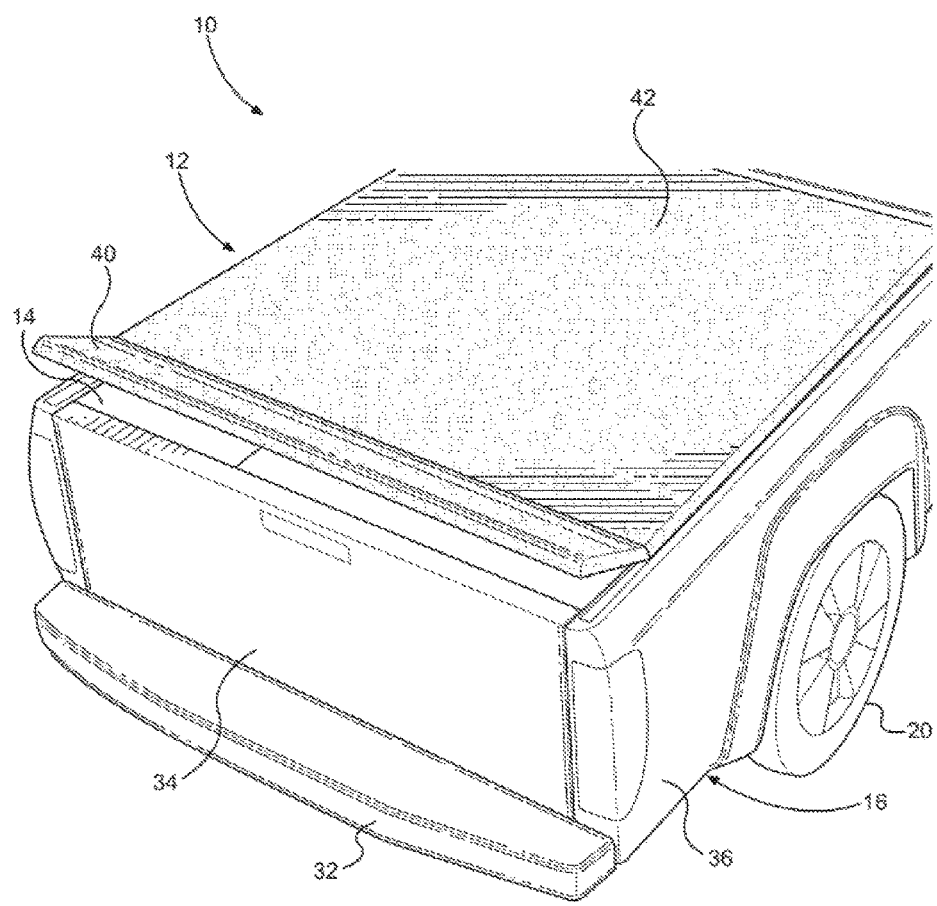
FIG. 2 is a rear perspective view of the vehicle and exemplary tonneau of FIG. 1, with a rear rail of the tonneau in a partially open position and the remainder of the tonneau in a closed position.

FIG. 1 is a rear perspective view of a vehicle 10 with an exemplary tonneau assembly 12 in accordance with the present disclosure, with the tonneau assembly 12 in a fully closed position; FIG. 2 is a rear perspective view of the vehicle 10 and exemplary tonneau 12 of FIG. 1, with a rear rail of the tonneau assembly 12 in a partially open position and the remainder of the tonneau assembly 12 in a closed position; and FIG. 3 is a rear perspective view of the vehicle 10 and exemplary tonneau 12 of FIG. 1, with the rear rail of the tonneau assembly 12 and part of a tonneau sheet in a partially open position.

A. Vehicle

Figure 3:
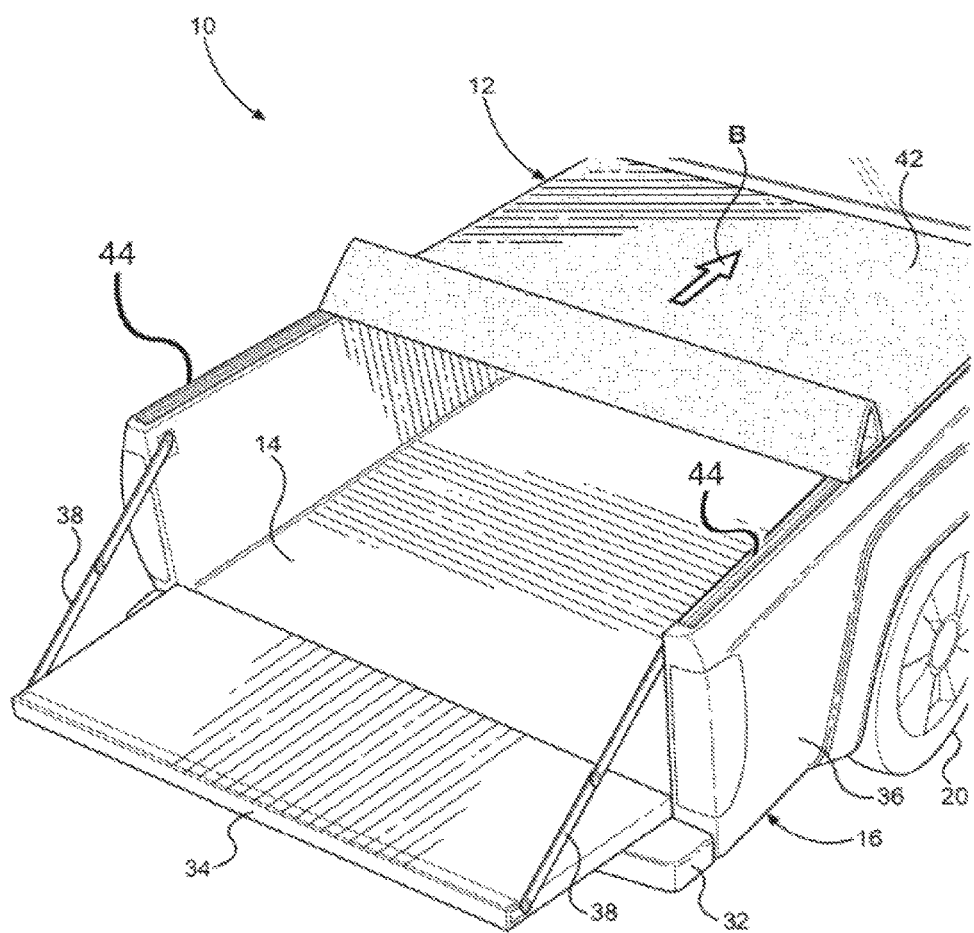
FIG. 3 is a rear perspective view of the vehicle and exemplary tonneau of FIG. 1, with a rear rail of the tonneau and a part of a tonneau sheet in a partially open position.

The vehicle 10 shown in FIGS. 1-3 is an automobile, and in particular a pickup truck with a truck bed 14, where the tonneau assembly is configured to fit over and cover the truck bed 14. However, the disclosed tonneau assemblies, and related methods of use and manufacture thereof, can be used with any vehicle that defines an exposed area, regardless of whether the area is exposed to an exterior of the vehicle or completely defined within the vehicle's interior. For example, embodiments are intended to be used with or otherwise include any vehicle configured for travel along any one or combination of improved, unimproved, and unmarked paths, such as any type of automobile, including a passenger car, minivan, truck, all-terrain vehicle (ATV), semi-tractor, off-highway vehicle, sport utility vehicle, other types of utility vehicles, multipurpose utility vehicle (MUV), side-by-side all-terrain vehicle (SxS, or SxS ATV), etc.

The vehicle 10 can include a truck bed 14, body 16, pair of front wheels 18, pair of rear wheels 20, pair of door assemblies 22, and powertrain. The body 16 can be integrated with a frame assembly such as in a unibody (aka, unit body) or monocoque construction, or the body 16 can be connected to a separately formed frame assembly such as a ladder frame construction. The powertrain is hidden from view in FIGS. 1-3.

The door assemblies 22, which occupy the door openings, each can include a door 24 and window panel assembly 26, and can be configured to selectively open and close access through the door openings by moving between a closed position and a fully opened position. In the closed position, the door assemblies 22 can span the respective door openings to obstruct access to the passenger area via the door openings. The fully opened position can be any position where the door assemblies 22 are pivoted away from the respective door openings to provide substantially unobstructed access to the passenger area via the door openings. FIG. 1 shows the door assemblies 22 in the fully closed position.

The vehicle 10 may, of course, include any number of additional or alternative features. For example, the vehicle 10 can include a roof panel 28, rear window 30, front window (hidden from view), rear bumper 22, tail gate 34, and a pair of side panels 36. The tail gate 34 can be pivotally connected to the body 16 adjacent the rear bumper 32 so as to be rotatable between an open position (shown in FIG. 3) and a closed position (shown in FIGS. 1 and 2). As shown in FIG. 3, support members 38 can be provided to support the tail gate 34 in the open position. In the embodiment shown in FIG. 3, one support member 38 is connected to each side of the tail gate 34 and an inside surface of one of the side panels 36.

The truck bed 14 can be defined by the tail gate 34 (in the closed position) positioned at the rearward end of the truck bed 14, opposing side panels 36 of the body 16, and front panel (hidden from view) disposed at the forward end of the truck bed 14 immediately behind the passenger compartment below the rear window 30. In the configuration shown in FIG. 1, the truck bed 14 is completely enclosed when the tail gate 34 is in the closed position and the tonneau assembly 12 is installed.

In many of the disclosed embodiments, each side of the vehicle 10 is symmetrical. However, embodiments are also intended to cover vehicles with asymmetrical configurations.

B. Tonneau

The tonneau assembly 12 can include a rear rail 40, and a sheet 42 including a rearward end connected to the rear rail 40. The rear rail 40 can be formed of any resilient or sufficiently resilient material for the desired application. In the embodiment shown in FIGS. 1-3, the rear rail 40 is formed of a rigid or relatively inflexible member. Contrarily, the sheet 42 is formed of a relatively flexible material (such as fabric), which enables it to be relatively light weight (enhancing fuel efficiency), easy to manipulate (e.g., during installation, removal, etc.), and compactable for storage. The sheet 42 is sized and shaped to cover at least a part of the truck bed 14.

It is intended that the rear rail 40 and sheet 42 can be formed of any known, related art, or later developed material. It is also intended that the sheet 42 can be connected to the rear rail 40 in any manner, such as by rivets, bolts, glue, epoxy, stitching, etc. It is also intended that the sheet 42 can be connected to the rear rail 40 at any location, such as at the rear rail's front, intermediate portion, rear, bottom, or top.

FIG. 1 shows the rear rail 40 in its closed position covering a rear end of the truck bed 14. As discussed in more detail with regard to FIGS. 7 and 8, a rear end of the rear rail 40 can be latched or otherwise secured in this closed position.

Figure 4:
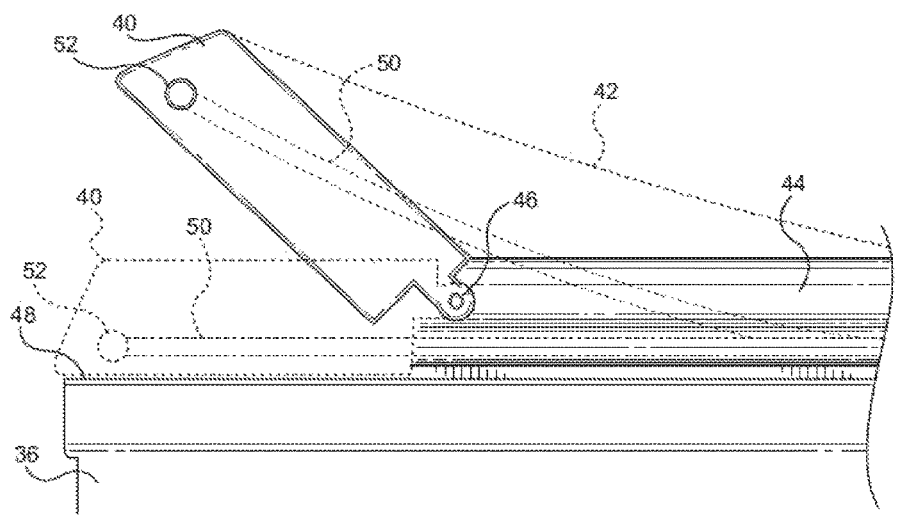
FIG. 4 is side plan schematic view of a rear rail, a part of a tonneau sheet, and a part of one of the side rails in accordance with the present disclosure.
Figure 7:
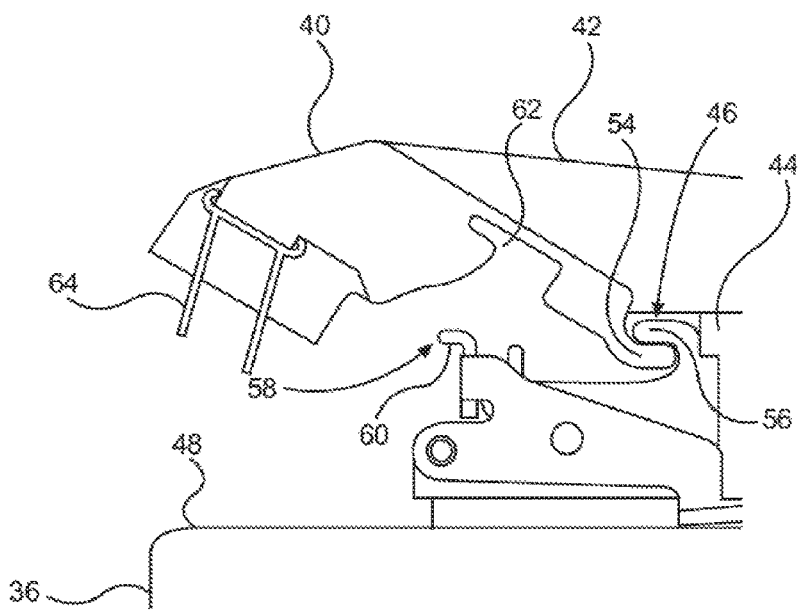
FIG. 7 is a side view of a rear rail, a part of a tonneau sheet, and a part of a side rail in accordance with the present disclosure, with the rear rail in an open position.
Figure 8:
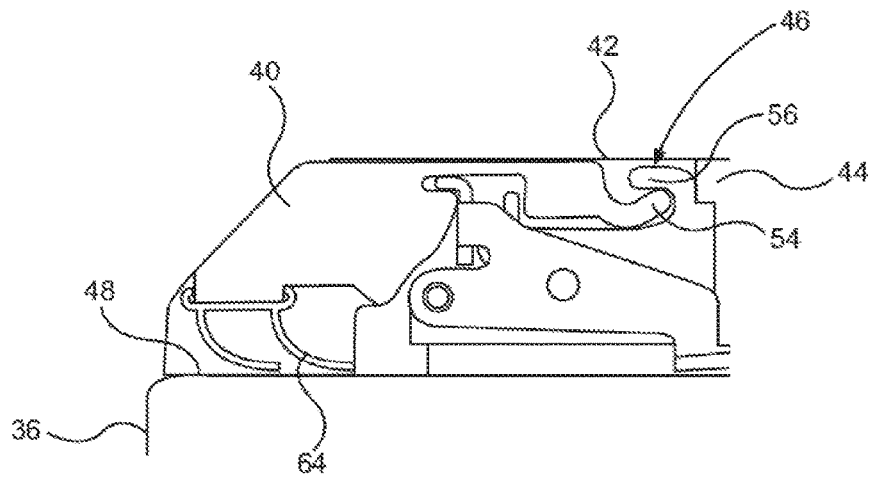
FIG. 8 is a side view of a rear rail, a part of a tonneau sheet, and a part of a side rail in accordance with the present disclosure, with the rear rail in a fully closed position.

However, as discussed in more detail with regard to FIGS. 4, 7, and 8, the rear rail 40 is removably and pivotally attached at the rear end of the truck bed 14. More specifically, if the rear rail 40 is unlatched, front side surfaces of the rear rail 40 that are pivotally attached at the rear end of the truck bed 14 enable the rear rail 40 to pivot or otherwise be rotatable. FIG. 2 shows the rear rail 40 as being pivoted at that location to expose a rear end of the truck bed 14.

This pivotal connection can also be disengaged to enable the rear rail 40 and sheet 42 to expose the truck bed 14. For example, as shown in FIG. 3, the rear rail 40 can be completely detached from the side rails 44 and used to fold or roll the sheet 42 in the direction indicated by arrow B to a storage position adjacent the passenger compartment. The rigid nature of the rear rail 40 enables it to be used to manually fold or roll the sheet 42 to expose the truck bed 14, and also to store the sheet 42 in a relatively compact manner in the storage position above a front rail 82 adjacent the passenger compartment.

In an embodiment, the sheet 42 covers the truck bed 14 under both longitudinal and lateral tension, such as to provide: protection from relatively large or heavy objects external to the vehicle; resistance to water pooling; support for objects placed on the upper surface of the sheet 42; and a smooth appearance. This bi-directional tension may also be effective to reduce flapping, such as during movement of the vehicle, which can generate noise.

Various exemplary structures for providing this bi-directional tension are disclosed below. However, these disclosures are provided for exemplary purposes, and are not intended to be limiting. Embodiments are intended to include or otherwise cover any structures or methods for performing this bi-directional tension in an easy, simple and effective manner.

II. Rear Rail Operation and Longitudinal Tension

FIG. 4 is side plan schematic view of a rear rail 40, a part of a sheet 42, and a part of one of the side rails 44 in accordance with the present disclosure; FIG. 7 is a side view of a rear rail 40, a part of a sheet 42, and a part of a side rail 44 in accordance with the present disclosure, with the rear rail 40 in an open position; and FIG. 8 is a side view of a rear rail 40, a part of a sheet 42, and a part of a side rail 44 in accordance with the present disclosure, with the rear rail 40 in a fully closed position.

The schematic view of FIG. 4 shows the rear rail 40 in the open position in solid lines, and the rear rail 40 in the closed position in dotted lines. In the embodiment of FIG. 4, the rear rail 40 is pivotally attached to one of two side rails 44 that are rigidly secured to upper surfaces 48 of the vehicular side panels 36 that define the sides of the truck bed 14. The connection between the side rails 44 and upper surfaces of the vehicular side panels 36 is described in detail with regard to FIG. 5. The pivotal connection between the rear rail 40 and the side rails 44 is accomplished via a hinge assembly 46, which is shown in detail in FIGS. 7 and 8.

FIG. 4 only shows one side of the rear rail 40 and its attachment to one of the side rails 44. The below explanation assumes that both sides of the rear rail 40 and both side rails 44 are symmetrical. However, some other embodiments may not include such symmetrical structures.

As shown in FIG. 4, pivoting the rear rail 40 upward to expose a rear portion of the truck bed 14 also lifts the sheet 42 upward by virtue of its attachment to the upper rail 40. Contrarily, rotating the rear rail 40 downwardly to the closed position lowers the sheet 42 to fully cover the truck bed 14.

FIG. 4 also shows cables 50 as dotted lines, which are attached via cable connectors 52 at opposing outer sides of the rear rail 40. As shown in FIG. 4, pivoting the rear rail 40 upward to expose a rear portion of the truck bed 14 also lifts the cables 50 upward and at least partially out of channels 77 defined by the side rails 44 by virtue of the cables 50 attachment to the rear rail 40, such that the cables 50 extend substantially parallel to the upper surface of the sheet 42. However, rotating the rear rail 40 downwardly to the closed position lowers the cables 50 downward, such that the cables 50 are positioned in the channels 77 and extend substantially parallel to the side rails 44. The operation of the cables 50 will be described in detail with regard to FIGS. 5 and 6 in the context of providing lateral tension.

FIGS. 7 and 8 show one side of the rear rail 40 and one of the side rails 44. The below explanation assumes that both sides of the rear rail 40 and both side rails 44 are symmetrical. However, some other embodiments may not include such symmetrical structures.

As shown in FIGS. 7 and 8, a hinge member 54 of the rear rail 40 is formed to project at a front end at each side of the rear rail 50. A corresponding hinge member 56 is formed to project from rear ends of each of the side rails 44. The hinge members 54 and 56 are formed to cooperate to enable rotation of the rear rail 40 relative to the side rails 44 upon application of manual force to the rear rail 40, if they are attached. However, hinge members 54 and 56 are formed to be detachable from one another to enable the rear rail 40 to be detachable from the side rails 44. For example, FIG. 3 shows the rear rail 40 as detached from the side rails 44 to enable the sheet 42 to be removed from the truck bed 14.

In a non-limiting example, the hinge members 56 are positioned on the upper surface 48 of the side panels 36 at the rear ends of the side rails 44 in a fixed position with respect to the side rails 44 to maximize the cargo space of the truck bed 14. As used herein, the term fixed position means that the hinge members 56 are integral with, or are secured to side rails 44 so that the hinge members 56 do not move with respect to the side rails 44 during use. Positioning of the hinge members 56 rearward of the side rails 44 allows both the side rails 44 and the hinge members 56 to be positioned at or outboard of an inboard edge of the upper surface 48 of the side panel 36, thereby maximizing the cargo space of the truck bed 14 and minimizing contact with any cargo contained therein.

A latch assembly 58 can also be provided to secure the rear rail 40 to the side rails 44 when the rear rail 40 is rotated to the closed position. For example, the latch assembly 58 enables the rear rail 40 to be secured in the closed position until intentionally manually opened by a user.

However, the present disclosure is not limited to such latching assemblies 58 and configurations. In a non-limiting example, one or more latch projections (not shown) is provided on or in the rear rail 40 that is configured to engage one or both of the side rails 44 or one or both of the side panels 36 when the rear rail 40 is rotated to the closed position.

The latch assembly 58 includes a latch projection 60 provided at an upper front surface of each of the side rails 44. A corresponding latch aperture 62 is defined at each side of a lower front surface of the rear rail 40. The latch projection 60 and latch aperture 62 are structured such that the latch projection 60 can be disposed within the latch aperture 62 to secure the rear rail 40 to the side rails 44. In particular, rotating the rear rail 40 downwardly causes the lower surface of the rear rail 40 to contact and thereby displace the latch projections 60. Continued downward pressure causes the displaced latch projections 60 to fit inside the latch apertures 62. The structure and shape of the latch apertures 62 holds the latch projections 60 within the latch apertures 62. A release mechanism (not illustrated) can be provided on the bottom surface of the rear rail that can be manually activated by a user in order to displace the latch projections 60 away from the latch apertures 62, to enable the rear rail 40 to become unlocked from the side rails 44 and thereby be rotated upwardly. In a non-limiting example, the latch assembly 58 and the release mechanism are positioned along the truck bed 14 forward of the rearward side of the rear rail 40 and the tail gate 34 when the rear rail 40 is in the closed position and the tail gate 34 is closed so that the latch assembly 58 and the release mechanism are not accessible from outside of the truck bed 14.

A seal member 64 can be attached or otherwise disposed at a lower surface at the rear end of the rear rail 40. FIG. 7 shows the seal member 64 with the rear rail 40 rotated upwardly to be in an open position, such that the seal member 64 is spaced from the upper surface 48 of the side panels 36. FIG. 8 shows the rear rail 40 in a closed position, such that the seal member 64 contacts the upper surface 48 of the side panels 36. In this position, the seal member 64 provides a seal between the exterior of the vehicle 10 and the area defined between the lower surface of the rear rail 40 and the upper surface 48 of the side panel. The seal that is provided may be beneficial by impeding or preventing entry of water, debris, dirt, etc. from entering truck bed 14 when the sheet 42 covers the truck bed 14.

However, embodiments are intended to include or otherwise cover other types of seal members and/or seal locations. It is intended that any seal member be provided at any seal location that may be beneficial. In fact, some embodiments do not include any seal members.

III. Side Rail Operation and Lateral Tension

Figure 5:
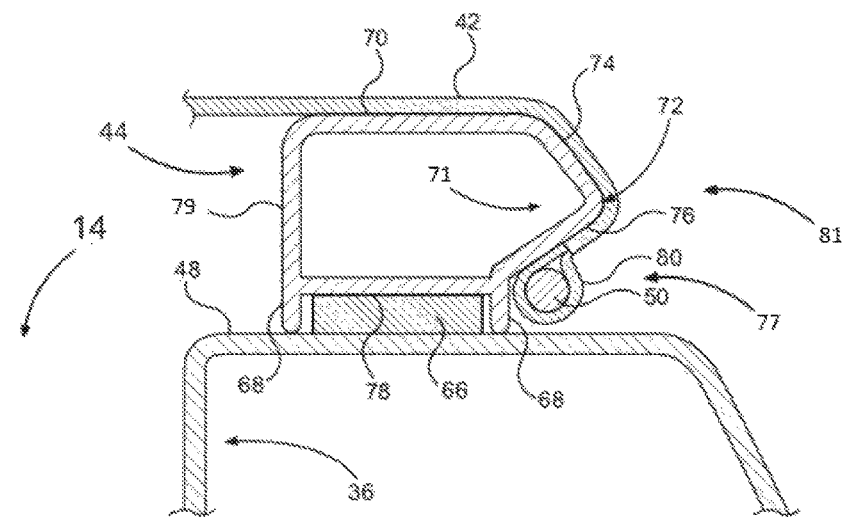
FIG. 5 is a side cross-sectional view taken along plane 5-5 of FIG. 1, showing a part of a tonneau sheet, a side rail, and a part of a side panel of a vehicle in accordance with the present disclosure.
Figure 6:
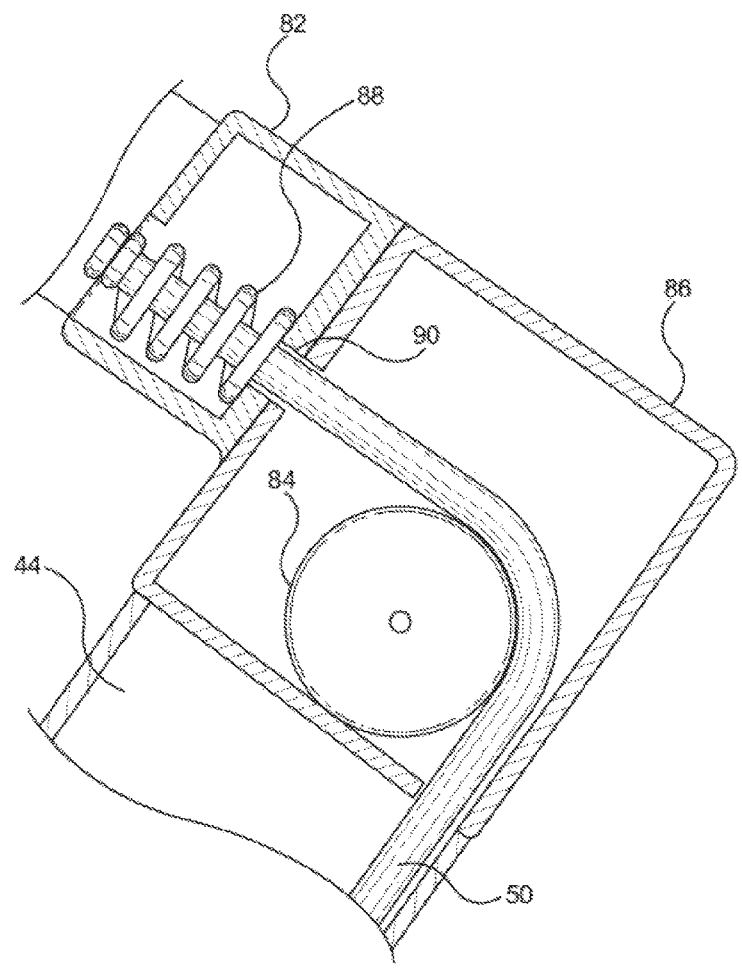
FIG. 6 is a cross-sectional top view of Region A shown in FIG. 1 showing a part of a side rail, a part of a front rail, a pulley and a cable in accordance with the present disclosure.
Figure 9:
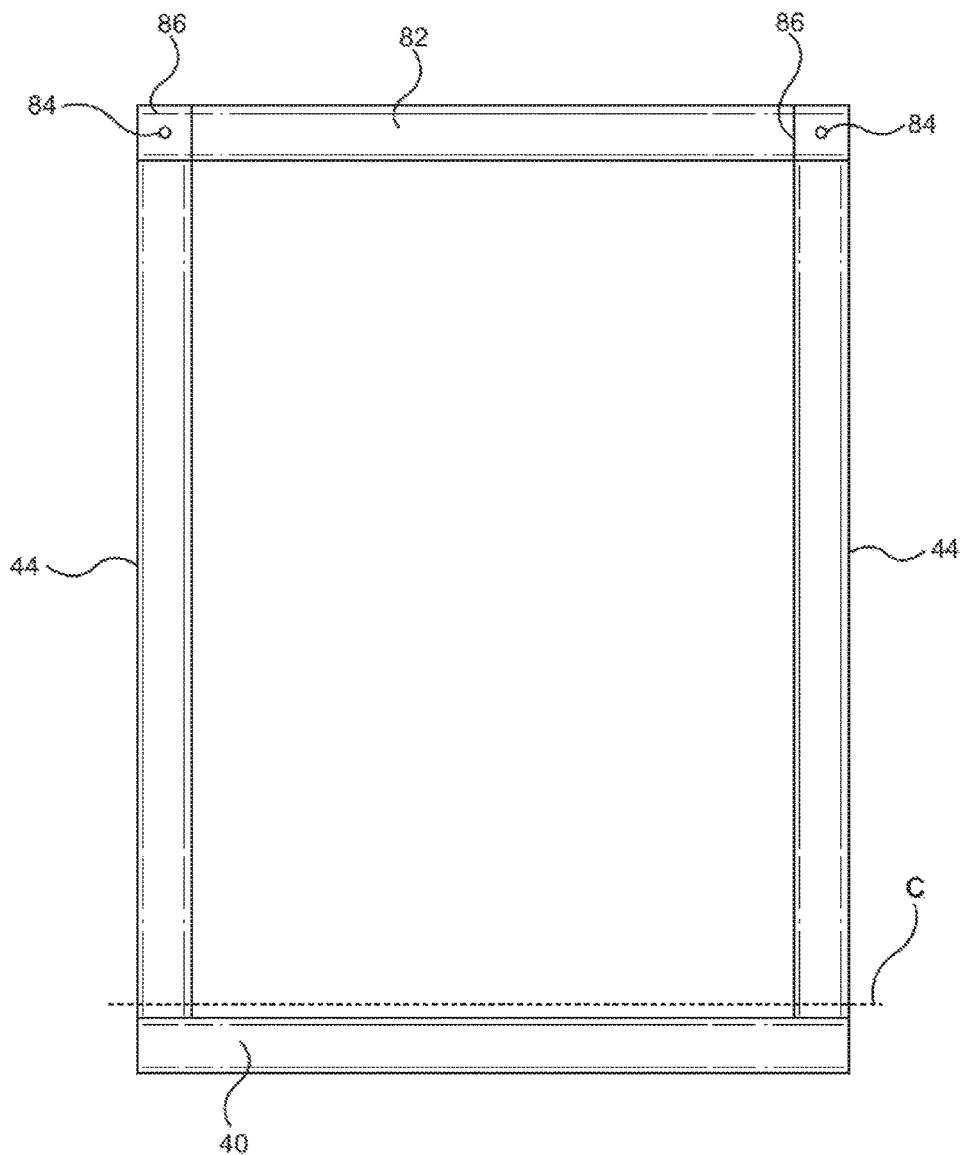
FIG. 9 is a schematic top plan view of a front rail, side rails, and a rear rail in accordance with the embodiment specifically shown in FIGS. 1-8 having two separate cables and springs.

FIG. 5 is a side cross-sectional view taken along plane 5-5 of FIG. 1, showing a lateral side 81 of the sheet 42, a side rail 44, and a part of a side panel 36 of a vehicle 10 in accordance with the present disclosure; FIG. 6 is a cross-sectional top view of Region A shown in FIG. 1 showing a part of a side rail 44, a part of the front rail 82, a pulley and a cable in accordance with the present disclosure; and FIG. 9 is a schematic top plan view of the front rail 82, side rails 44, and a rear rail 40 in accordance with the embodiment specifically shown in FIG. 6 having two separate rails and springs.

FIG. 5 only shows one lateral side 81 of the sheet 42, the side rails 44, and other corresponding structures. The below explanation assumes that both lateral sides 81 of the sheet 42, both side rails 44, and the corresponding structures are symmetrical. However, some other embodiments may not include such symmetrical structures.

As shown in FIG. 5, the side rails 44 are rigidly secured to the upper surface 48 of each of the side panels 36. Embodiments are intended to include or otherwise cover any apparatus or method for obtaining and maintaining this secured connection in a removable manner, including but not limited to bolts, screws, clamps, etc. Embodiments are intended to include or otherwise cover any apparatus or method for obtaining and maintaining this secured connection in a permanent manner, including but not limited to glue, epoxy, welding, etc.

In the embodiment shown in FIG. 5, the side rails 44 each include a pair of parallel legs 68, the bottom surfaces of which are attached to the upper surface 48 of each of the side panels 36. A seal 66 is provided between the legs 68 of each of the side rails 44, and in contact with a base or lower surface 78 of the side rails 44 and the upper surface 48 of the side panels 36. The seal 66 may be beneficial by impeding or preventing entry of water, debris, dirt, etc. from entering the truck bed 14 when the sheet 42 covers the truck bed 14. However, embodiments are intended to include or otherwise cover other types of seal members and/or seal locations. It is intended that any seal member be provided at any seal location that may be beneficial. In fact, some embodiments do not include any such seal members.

The side rails 44 include a substantially planar upper surface 70, an outboard wall 71, the lower surface 78, and an inboard wall 79. The outboard wall 71 includes an edge or lobe 72 extending outward from the upper surface 70. The lobe 72 includes an upper wall or camming surface 74 and a lower wall or camming surface 76. The upper camming surface 74 extends downwardly at an angle relative to the planar upper surface 70, and the lower camming surface 76 extends upwardly at an angle from the lower surface 78. The upper and lower camming surfaces 74, 76 intersect at an angle at the lobe 72 that may be positioned approximately at a midpoint between the lower surface 78 and the planar upper surface 70. The lobe 72 at the junction of the upper and lower camming surfaces 74, 76 can be radiused to provide a smooth transition therebetween. The lower camming surface 76 of the outboard wall 71 and the upper surface 48 of the side panels 36 at least partially define the channel 77. The channel 77 may extend along the entire length of the side rails 44.

FIG. 5 also shows one of the cables 50 that is secured to the lateral side 81 of the sheet 42. In a non-limiting example, a sleeve 80 is formed at an edge at each lateral side 81 of the sheet 42, and the sleeves 80 are configured to retain the cables 50 therein. It is intended that the sleeves 80 be formed in any manner, such as by stitching, rivets, glue, epoxy, etc. In some embodiments, the cables 50 are first placed in contact with the relevant edges of the sheet 42, and the sleeves 80 are formed around the cables 50. As explained with regard to FIG. 4, an end of each of the cables 50 is attached to one of the opposing sides of the rear rail 40 via cable connectors 52. Because the cables 50 are also retained in the sleeves 80 of the sheet 42, rotation of the rear rail 40 causes the sheet 42 as well as the cables 50 retained in the sleeves 80 thereof to move upwardly or downwardly depending on the direction of rotation of the rear rail 40. The upward or downward movement causes the cables 50 to move along the upper and lower camming surfaces 74, 76. For example, when the rear rail 40 is engaged with the side rails 44 it is rotatable between a closed position wherein the rearward side of the rear rail 40 is lowered and the cables 50 are positioned in the respective channel 77 of each side rail 44 as shown in FIG. 5 under tension to secure the lateral sides 81 of the flexible sheet 42 to the side rail 44, and an open position wherein the rearward side of the rear rail 40 is raised and cables are untensioned and removable from the channels 77. In a non-limiting example, at least a portion of the cables 50 are removed from the channels 77 of the side rails 44 when the rear rail 40 is rotated from the closed position to the open position. In a non-limiting example, the rear rail 40 is rollable from the open position toward the forward end of the truck bed 14 to remove the cable 50 from the channels 77 and place the sheet 42 in the storage position at the forward end of the truck bed 14.

As shown in FIG. 9, the rear rail 40 is disposed at the rear ends on the side rails 44, which extend parallel along the upper surfaces 48 of the side panels 36. A front rail 82 is provided at front ends of the side rails 44. The front rail 82 is secured to an upper surface of a panel disposed at the front end of the truck bed 14 immediately below the rear window 30. FIG. 9 also shows in a dotted line a pivot axis C of the rear panel 40 relative to the side rails 44, which is affected by virtue of the hinge assembly 46.

As shown in FIGS. 6 and 9, a pulley 84 is provided within a corner piece 86 of the rails, which is disposed where the front end of each side rail 44 meets the opposite ends of the front rail 82. The pulleys 84 are disposed such that front end portions of the cables 50 that extend out from the sleeves 80 of the sheet 42 communicate with exterior surfaces of the pulleys 84 to cause an approximately 90 degree change in the direction of extension of the cables 50. In other words, the cables 50 extend within the sleeves 80 substantially parallel to the direction of extension of the side rails 44, exit the sleeves 80 and extend around the pulleys 84, causing the cables 50 to reorient by 90 degrees and extend in a direction parallel to the direction of extension of the front rail 82.

A spring 88 is disposed adjacent each opposing end and within the front rail 82. The end of each cable 50 is rigidly secured to an end of one of the springs 88. Embodiments are intended to include or otherwise cover any apparatus or method of attaching the end of the cables 50 to the ends of the springs 88. In the embodiment shown in FIG. 6, the end of each spring 88 is crimped to fit tightly around the end of one of the cables 50 and thus the secured connection is achieved by pressure fit. However, other embodiments achieve this connection in other ways.

An aperture 90 is defined in each end of the front rail 82 adjacent the springs 88. The apertures 90 are sized and shaped to enable the cables 50 to extend therethrough, but are too small to enable the springs 88 to enter. Thus, the springs 88, as well as the front ends of the cables 50, are trapped within the front rail 82, which as discussed below enables the longitudinal tensioning of the sheet 42, which thereby facilitates the lateral tensioning of the sheet 42 by virtue of the cable 50 and the lobe 72 of the side rails 44.

It is to be understood that the front rail 82 and optionally the corner pieces 86 are removable from the side rails 44 to allow for complete removal of the sheet 42 from the side rails 44.

IV. Operation

The operation of the exemplary structures disclosed in the preceding sections is discussed below.

The front rail 82 is positioned on an upper surface of a panel that defines the front end of the truck bed 14 immediately rearward and below the rear window 30. Thus, in order to install the tonneau 12 to cover the top of the truck bed 14, the rear rail 40 and tonneau sheet 42 are moved rearwardly, i.e., in a direction opposite to the direction indicated by arrow B in FIG. 3. This rearward movement is continued until the rear rail 40 is disposed adjacent the rear end of the truck bed 14, as shown in FIG. 2.

The rear rail 40 is brought toward the rear end of the truck bed 14 adjacent the tail gate 34 until each of the hinge members 54 of the rear rail 40 is aligned with the respective one of the hinge members 56 of the side rails 44. The hinge members 54 of the rear rail 40 are then placed in engagement with the respective hinge members 56 of the side rails 44. The rearward side of the rear rail 40 is then rotated downwardly from the orientation shown in FIG. 2 to the fully closed position shown in FIG. 1. The rear rail 40 is placed in an over-center position if the rear rail 40 is secured in the closed position by the latch assembly 58. This over-center position of the rear rail 40 applies tension in the sheet 42 in the longitudinal direction L.

Rotating the rear rail 40 downwardly from the orientation shown in FIG. 2 to the fully closed position shown in FIG. 1 results in the simultaneous application of transverse or lateral tension to the sheet 42 (See arrow T in FIG. 1). Specifically, as the rear rail 40 is rotated downwardly toward the fully closed position, the sleeves 80 at the sides of the sheet 42 and the cables 50 disposed therein travel downwardly along the upper camming surface 74 toward the lower camming surface 76 and into the channels 77. Simultaneously, springs 88 apply tension in the cable 50 as rotating rear rail 40 pulls on the cables 50 in the longitudinal direction L generally toward the tail gate 34. The sleeves 80 and the cables 50 continue their travel downwardly along the lower camming surface 76 and terminate in the channels 77 at the bottom of the lower camming surface 76 adjacent the upper surface 48 of the side panel 36, as shown in FIG. 5.

The orientation of the upper and lower camming surfaces 74, 76 and the tension in the cables 50 applied by the springs 88 operate to hold the cables 50 and sleeves 80 at the bottom of the lower camming surfaces 76. The sheet 42, the camming surfaces 74, 76 and the spacing between the side rails 44 are dimensioned so that the sheet 42 is laterally tensioned in the transverse direction T if the cables 50 are retained by the lower camming surfaces 76 of the side rails 44. In other words, retaining the cables 50 and sleeves 80 at the bottom of the lower camming surface 76 applies lateral tension to the sheet, which causes the sheet 42 to fit tightly over the truck bed 14 at least with regard to the lateral component.

In the event a downward force is applied to the upwardly facing surface of the sheet 42 between the side rails 44 when the rear rail 40 is in the closed position, the location of the lobe 72 outboard of where the cable 50 is positioned in the channel 77 inhibits inboard movement of the lateral sides 81 of the sheet 42.

Thus, as discussed above with regard to the disclosed structures, the single operation of rotating the rear rail 40 downwardly causes the simultaneous application of longitudinal and lateral tension to the sheet 42, causing the sheet to tightly fit over the truck bed 14 both longitudinally and laterally. This operation is beneficial by providing a relatively simple and efficient procedure for installing the tonneau 12 over the truck bed 14. For example, this operation may obviate the user from separately attaching each side of the tonneau to the corresponding side of the truck bed to manually apply lateral tension, which would entail the user traveling along the edge of the truck bed. Instead, in accordance with the disclosed structure, the user merely rotates the rear rail 40 downwardly to apply both longitudinal and lateral tension, such as form a single location behind or beside the rear rail 40.

V. Alternative Embodiment of FIG. 10

Figure 10:
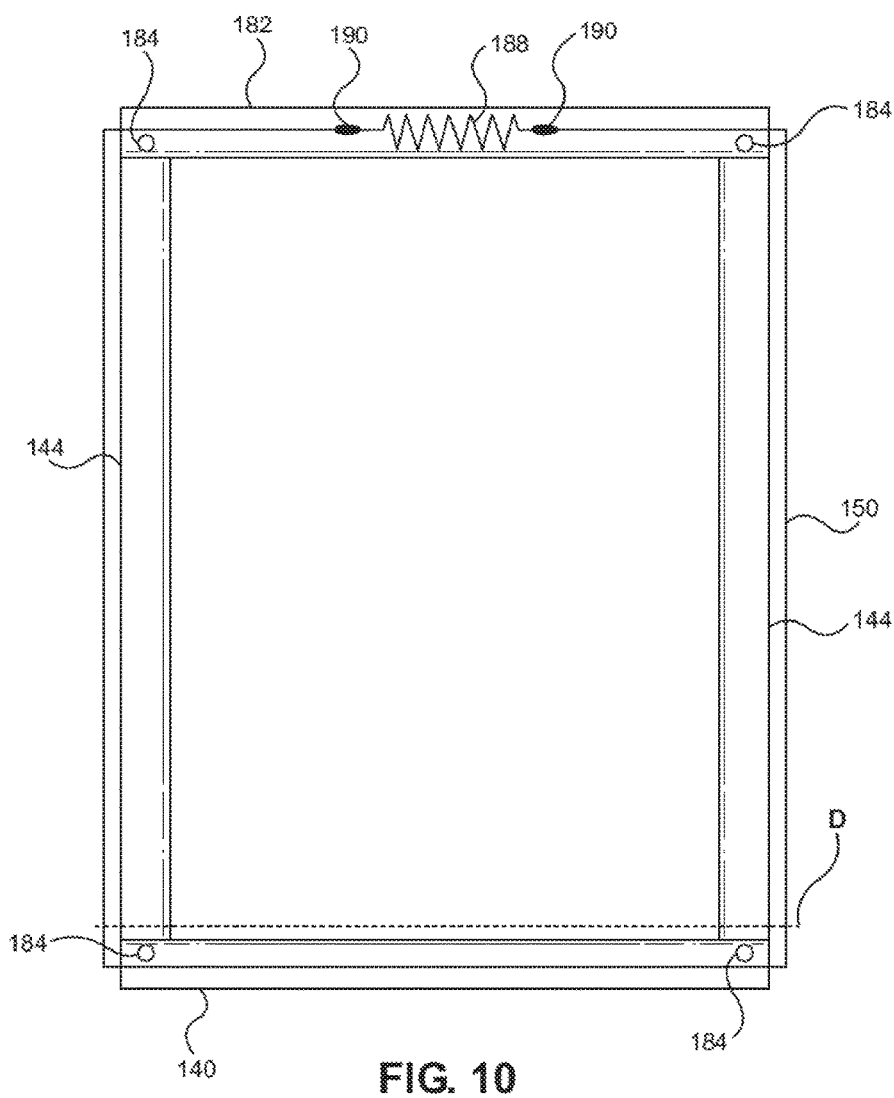
FIG. 10 is a is a schematic top plan view of a front rail, side rails, and a rear rail in accordance with an alternative embodiment having a single cable and spring.

FIG. 10 is a is a schematic top plan view of a front rail 182, side rails 144, and a rear rail 140 in accordance with an alternative embodiment having a single cable 150 and single spring 188. Thus, the embodiment of FIG. 10 differs from the embodiment of the previous figures, in that the embodiment of FIG. 10 only includes a single cable 150 and single spring 188, as opposed to the two cables 50 and two springs 88 of the other figures.

As shown in FIG. 10, a single cable 150 extends along the entire perimeter of the rail assembly, i.e., along the rear rail 140, both side rails 144, and the front rail 182. The portions of the cable 150 that extend along the length of the side rails 144 may be secured to the lateral sides of the sheet (not shown) as described in the previous embodiments. The single cable 150 is able to adopt this path by virtue of four pulleys 184 disposed at both ends of both side rails 144, i.e., at the intersections of the front ends of both side rails 144 and the front rail 182, and the intersections of the rear ends of both side rails 144 and the rear rail 140. The pulleys 184 thereby enable the single cable 150 to change its direction of extension by approximately 90 degrees at four locations.

The single spring 150 is disposed within the front rail 182 at approximately a longitudinal midpoint in the front rail, i.e., in its direction of extension. Opposing ends of the single spring 188 are rigidly secured to opposing ends of the single cable 150 by connectors 190. As similarly disclosed above with regard to the two springs 88 of the previous embodiment, the ends of the single spring 188 can be connected to the single cable 150 by any apparatus or method, such as the ends of the spring 188 being crimped to fit tightly around the ends of the cable 150 to achieve the secured connection.

The single spring 188 and the single cable 150 thereby form a single integrated structure for providing the bi-directional tensioning of the sheet. As explained in detail below, the embodiment of FIG. 10 provides the same or similar result as the embodiment of the previous figures by applying the bi-directional tensioning based on the single act of rotating the rear rail 140 downwardly. However, this tensioning is accomplished by expanding the spring 188, as opposed to compressing the spring 188.

For example, the rear rail 140 is brought toward the rear end of the truck bed 14 adjacent the tail gate 34 until each of the hinge members 54 of the rear rail 140 is aligned with the respective one of the hinge members 56 of the side rails 144. The hinge members 54 of the rear rail 140 are then placed in engagement with the respective hinge members 56 of the side rails 144. The rear rail 140 is then rotated downwardly from the orientation shown in FIG. 2 to the fully closed position shown in FIG. 1. The rear rail 140 is placed in an over-center position if the rear rail 140 is secured in the closed position by the latch assembly 58. This over-center position of the rear rail 140 applies tension in the sheet 42 in the longitudinal direction L.

Rotating the rear rail 140 downwardly from the orientation shown in FIG. 2 to the fully closed position shown in FIG. 1 results in the simultaneous application of transverse or lateral tension to the cable 150 and thus the sheet (See arrow T in FIG. 1). Specifically, as the rear rail 140 is rotated downwardly toward the fully closed position, the sleeves at the sides of the sheet and the cable 150 disposed therein travel downwardly along the upper camming surface 74 toward the lower camming surface 76. Simultaneously, spring 188 applies tension to the cable 150 as the rotating rear rail 140 pulls on the cable 150 in the longitudinal direction L generally toward the tail gate 34. The sleeves 80 and the cable 150 continue their travel downwardly along the lower camming surfaces 76 and terminate at the bottom of the lower camming surfaces 78 adjacent the upper surface 48 of the side panel 36, as shown in FIG. 5.

The orientation of the upper and lower camming surfaces 74, 76, the lobe 72, and the tension in the cable 150 applied by the spring 188 operates to hold the cable 50 and sleeves 80 in the channels 77 at the bottom of the lower camming surfaces 76. The sheet 42, the camming surfaces 74, 76, the lobe 72, and the spacing between the side rails 44 are dimensioned so that the sheet 42 is laterally tensioned in the transverse direction T if the cable 150 is retained by the lower camming surfaces 76 of the side rails 144. In other words, retaining the cable 150 and sleeves 80 at the bottom of the lower camming surface 76 applies lateral tension to the sheet, which causes the sheet 42 to fit tightly over the truck bed 14 at least with regard to the lateral component.

VI. Other Alternative Embodiments

While certain embodiments of the invention are described above, and FIGS. 1-10 disclose the best mode for practicing the various inventive aspects, it should be understood that the invention can be embodied and configured in many different ways without departing from the spirit and scope of the invention.

The structures are explained above in the context of a truck bed of a pickup truck. However, as previously disclosed, the various embodiments are intended to be applied to any type of vehicle having an internal or external exposed area.

The embodiments shown in FIGS. 1 through 9 includes two separate cables and two separate springs, and the embodiment of FIG. 10 includes only a single cable and a single spring. However, the various embodiments are intended to include or otherwise cover assemblies with any number of springs and cables, include either even numbers of either apparatus. In fact, embodiments are intended to include or otherwise cover assemblies that do not include any springs and provide tensioning forces in other ways, such as via pneumatics, electric or stepper motors, etc.

The embodiment of FIG. 1 through 9 may include two pulleys for the two cables, while the embodiment of FIG. 10 embodiment includes four pulleys for the single cable. However, embodiments are intended to include or otherwise cover any number of pulleys to accomplish the appropriate orientation of the cable(s). In fact, it is intended for some embodiments to not include any pulleys and the proper cable orientation is provided in other ways. In fact, in some embodiments, the cable(s) may not need to be reoriented.

The disclosed embodiments also cover methods of manufacturing any of the components disclosed above. These methods of manufacturing include or otherwise cover electronics, processors and computer programs implemented by processors used to perform and/or design various elements of the storage assemblies disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

While the subject matter has been described in detail with reference to exemplary embodiments thereof, it will be apparent to one skilled in the art that various changes can be made, and equivalents employed, without departing from the scope of the invention. Any related art references discussed in the above Background Section are hereby incorporated by reference in their entirety.

What is claimed is:

1. A tonneau assembly for removably covering a bed of a vehicle, the tonneau assembly comprising:
    a tonneau sheet configured to cover at least a part of the bed of the vehicle;
    a rail assembly including a front rail connected to the tonneau sheet, a rear rail, and a pair of longitudinally extending side rails configured to be statically disposed relative to the front rail, the rear rail being pivotable relative to the side rails between an open position that uncovers at least a part of the bed of the vehicle, and a closed position that covers at least a part of the bed of the vehicle, the rear rail being connected to the tonneau sheet so as to apply a tensioning force in the longitudinal direction as the rear rail is pivoted from the open position to the closed position; and
    a lateral tensioning assembly that is configured to apply a tensioning force in a lateral direction that is perpendicular to the longitudinal direction as the rear rail is pivoted from the open position to the closed position, wherein the lateral tensioning assembly includes a pair of cables that are disposed within hollow sleeves formed along opposing sides of the tonneau sheet, the opposing sides of the tonneau sheet being configured to communicate with the side rails of the rail assembly, and the lateral tensioning assembly includes a pair of pulleys that are each disposed proximate a front end of one of the side rails and that are each configured to communicate with the cables to cause an approximately 90 degree change in direction of extension of the cables, the lateral tensioning assembly also including a pair of springs that are each rigidly connected to a front end of one of the cables and disposed within the front rail.

2. The tonneau assembly of claim 1, wherein opposing sides of a front end of the rear rail include hinge members, and complimentary hinge members are formed at a rear end of each of the side rails, the hinge members and complimentary hinge members being configured to enable the rear rail to be pivotally and removably connectable to the rear end of each of the side rails.

3. The tonneau assembly of claim 2, wherein the rear end of each of the side rails includes a latch assembly that cooperates with a corresponding aperture defined in opposing sides at the front end of the opposing sides of the rear rail to enable the rear rail to be removably secured to the side rails upon being pivoted to the closed position.

4. The tonneau assembly of claim 1, wherein the front rail defines apertures at opposing ends, the apertures being sized to enable the cables to extend therethrough but preventing entry of the springs into the apertures, such that applying a force to the cables in the longitudinal direction compresses the spring connected thereto.

5. The tonneau assembly of claim 1, wherein the bed of the vehicle is defined by vertically extending panels, and the side rails are configured to be statically secured to upper surfaces of the panels.

6. The tonneau assembly of claim 5, wherein each of the side rails defines camming surfaces facing away from the bed, the camming surfaces including upper and lower camming surfaces that intersect at an angle sufficient to hold the cable and hollow sleeve against the lower surface and thereby provide lateral tensioning of the sheet if the rear rail is pivoted from the open position to the closed position.

7. The tonneau assembly of claim 6, wherein the side rails each include a planar top surface, and the camming surfaces are configured such that an inner surface of the sheet is disposed against the upper camming surface and the top surface if the rear rail is disposed in the closed position.

8. The tonneau assembly of claim 1, wherein the lateral tensioning assembly includes a single spring disposed within the front rail, a single cable rigidly secured to opposing ends of the spring, and pulleys disposed at locations where the side rails intersect the front and rear rails, the cable extending within the front rail and the side rails and communicating with the pulleys and the spring to apply the longitudinal and lateral tensioning forces as the rear rail is pivoted from the open position to the closed position.

9. A vehicle, comprising:
   vertically extending panels configured to define an area therebetween that is exposed in the vertical direction;
   a tonneau sheet configured to cover at least a part of the exposed area;
   a rail assembly connected to an upper surface of the panels, the rail assembly including a front rail connected to the tonneau sheet, a rear rail, and a pair of longitudinally extending side rails configured to be statically disposed relative to the front rail, the rear rail being pivotable relative to the side rails between an open position that uncovers at least a part of the exposed area, and a closed position that covers at least a part of the exposed area, the rear rail being connected to the tonneau sheet so as to apply a tensioning force in the longitudinal direction as the rear rail is pivoted from the open position to the closed position, wherein opposing sides of a front end of the rear rail include hinge members, and complimentary hinge members are formed at a rear end of each of the side rails, the hinge members and complimentary hinge members being configured to enable the rear rail to be pivotally and removably connectable to the rear end of each of the side rails; and
   a lateral tensioning assembly that is configured to apply a tensioning force in a lateral direction that is perpendicular to the longitudinal direction as the rear rail is pivoted from the open position to the closed position.

10. The vehicle of claim 9, wherein at least one of the rear ends of the side rails includes a latch assembly that cooperates with a corresponding aperture defined in the front end of the rear rail to enable the rear rail to be removably secured to the side rails upon being pivoted to the closed position.

11. A tonneau assembly for removably covering a bed of a vehicle, the tonneau assembly comprising:
   a flexible sheet including a forward end, a rearward end, a first lateral side extending from the forward end to the rearward end, and a second lateral side extending from the forward end to the rearward end;
   a first cable secured to the first lateral side of the flexible sheet;
   a second cable secured to the second lateral side of the flexible sheet;
   a first side rail positionable on or adjacent an upper surface of a first side panel, the first side rail includes an outboard wall that at least partially defines a first channel;
   a second side rail positionable on or adjacent an upper surface of a second side panel, the second side rail includes an outboard wall that at least partially defines a second channel;
   a front rail secured to the forward end of the flexible sheet, the front rail is securable to the first side rail and the second side rail; and
   a rear rail secured to the rearward end of the flexible sheet, the rear rail is operatively connected to the first cable and the second cable and is removably engageable with the first side rail and the second side rail, the rear rail includes a rearward side that is rotatable when the rear rail is engaged with the first side rail and the second side rail between a closed position wherein the rearward side of the rear rail is lowered and the first cable is positioned in the first channel under tension and the second cable is positioned in the second channel under tension to secure the flexible sheet to the first side rail and the second side rail, and an open position wherein the rearward side of the rear rail is raised and the first cable is untensioned and is removable from the first channel and the second cable is untensioned and is removable from the second channel.

12. The cover assembly of claim 11, wherein at least a portion of the first cable is removed from the first channel of the first side rail and at least a portion of the second cable is removed from the second channel of the second side rail when the rear rail is rotated from the closed position to the open position.

13. The cover assembly of claim 12, wherein the rear rail is rollable from the open position toward the forward end of the truck bed to remove the first cable from the first channel and the second cable from the second channel and place the flexible sheet in a storage position.

14. The cover assembly of claim 11, wherein the first side rail comprises an upper surface, the outboard wall comprises an upper wall that extends outboard from the upper surface of the first side rail to at least partially define an edge on the outboard wall, and wherein the flexible sheet is positioned over the upper surface of the first side rail, the upper wall of the outboard wall, and the edge of the outboard wall with the first cable positioned in the first channel inboard of the edge of the outboard wall when the rear rail is in the closed position.

15. The cover assembly of claim 14, wherein the outboard wall comprises a lower wall that intersects the upper wall at the edge of the outboard wall, wherein the lower wall extends inboard from the edge of the outboard wall, wherein the first channel is at least partially defined by the lower wall of the outboard wall and an upper surface of the first side panel when the first side rail is positioned on or adjacent the first side panel, and wherein the flexible sheet is positioned over at least a portion of the lower wall when the rear rail is in the closed position.

16. The cover assembly of claim 14, further comprising a pair of hinge members, and a latch assembly that are positionable along the bed of the vehicle forward of a tail gate that is positioned at a rearward end of the bed of the vehicle, wherein each hinge member is positioned at a rear end of one of the side rails, the hinge members are configured to pivotally engage the rear rail, wherein the latch assembly is capable of securing the rear rail to at least one of the side rails when the rear rail is in the closed position, and wherein the latch assembly is inaccessible from outside the bed of the vehicle when the rear rail is in the closed position and the tail gate is closed.

* * * * *